United States Patent [19]
Dixon et al.

[11] Patent Number: 5,756,618
[45] Date of Patent: May 26, 1998

[54] POLYOL(ALLYL CARBONATE) COMPOSITIONS CONTAINING EPOXY FOR REDUCED SHRINKAGE

[75] Inventors: Kenneth Dixon, Fairfield; Mary Ann Kelly, Danbury, both of Conn.

[73] Assignee: Akzo Nobel nv, Arnhem, Netherlands

[21] Appl. No.: 800,316

[22] Filed: Feb. 14, 1997

[51] Int. Cl.$^6$ ................... C08F 18/24; C08F 2/00
[52] U.S. Cl. ........................... 526/204; 526/314
[58] Field of Search .................. 526/273, 204, 526/314

[56] References Cited

U.S. PATENT DOCUMENTS

| | | | |
|---|---|---|---|
| 4,138,538 | 2/1979 | Kaetsu et al. | 526/73 |
| 4,139,578 | 2/1979 | Baughman et al. | 260/871 |
| 4,217,433 | 8/1980 | Dyball | 525/277 |
| 4,346,197 | 8/1982 | Crano et al. | 525/277 |
| 4,408,016 | 10/1983 | Eads et al. | 525/277 |
| 4,521,577 | 6/1985 | Romano et al. | 526/261 |
| 4,623,708 | 11/1986 | Ezrielev et al. | 526/314 |
| 4,812,545 | 3/1989 | Renzi et al. | 526/230.5 |
| 4,957,981 | 9/1990 | Schutyser et al. | 525/529 |
| 5,017,666 | 5/1991 | Crano et al. | 526/230.5 |

FOREIGN PATENT DOCUMENTS

| | | | |
|---|---|---|---|
| 0 300 672 | 1/1989 | European Pat. Off. | C08J 7/12 |
| 0 593 877 | 4/1994 | European Pat. Off. | G02B 1/04 |

OTHER PUBLICATIONS

Abstract, JP-171235, Jan. 19, 1989.
Abstract, JP 58/120618, Jul. 18, 1983.

Primary Examiner—Joseph L. Schofer
Assistant Examiner—Wu C. Cheng
Attorney, Agent, or Firm—Ralph Mancini; Louis A. Morris

[57] ABSTRACT

The present invention relates to a polyol(allyl carbonate) based casting composition suitable for forming high quality ophthalmic lenses which contains an epoxy compound in an amount effective to reduce shrinkage during its final polymerization in a mold. The casting composition of the present invention comprising polyol(allyl carbonate) and epoxy compound contains an initiator for the polymerization of the polyol(allyl carbonate), but does not contain a catalyst for polymerization of the epoxy compound. The invention also relates to a method for reducing the shrinkage of casting compositions comprising

13 Claims, No Drawings

POLYOL(ALLYL CARBONATE) COMPOSITIONS CONTAINING EPOXY FOR REDUCED SHRINKAGE

BACKGROUND OF THE INVENTION

Polyol(allyl carbonate) monomers are polymerized by free radical initiators to yield hard polymers. Many of these monomers yield rigid polymers that are essentially transparent to visible light, are substantially colorless, have indices of optical refraction of from about 1.45 to about 1.55, and possess a Barcol hardness above about 20. For these reasons, such monomers find utility as a precursor for transparent coatings, optical lenses and other optical elements, and flat or curved transparent sheets.

One problem associated with the free radical initiated polymerization of polyol(allyl carbonate) monomers is the lengthy polymerization (cure) time required to obtain a full cure, e.g., on the order of 12 to 24 hours for the diisopropyl peroxydicarbonate initiated homopolymerization of diethylene glycol bis(allyl carbonate) monomer. Another problem associated with the polymerization of polyol(allyl carbonate) monomers is the relatively high shrinkage of the material which occurs during the course of polymerization, which can range up to 13%, or higher. For a lens, such shrinkage causes the casting to lose contact with the mold surface thereby changing dimensions of the lens and forming internal stresses. Additionally, the lens casting is damaged and may also crack, leading to yield decreases.

Several Patents have attempted to alleviate the problems associated with the polymerization of polyol (allyl carbonate) monomers. For example, U.S. Pat. No. 4,346,197 describes compositions of bis(allyl carbonate) monomer and a high molecular weight unsaturated polymer, e.g., an acrylate polymer, which compositions allegedly exhibit reduced shrinkage.

U.S. Pat. No. 4,408,016 describes three component compositions comprising the bis(allyl carbonate) blends of U.S. Pat. No. 4,346,197 and a multi-functional acrylate monomer. These three component blends are characterized by allegedly shorter initial cure times and polymerizates of reduced haze.

U.S. Pat. No. 4,139,578 describes compositions of a bis(allyl carbonate) monomer, an ethylenically unsaturated polyester and an ester of an unsaturated dicarboxylic acid. These compositions allegedly exhibit reduced shrinkage during polymerization.

U.S. Pat. No. 4,217,433 describes the use of allyl group-containing copolymers of an acrylic monomer and an allyl monomer to reduce the shrinkage of polyol(allyl carbonate) compositions.

Low shrinkage compositions of diethylene glycol bis (allyl carbonate), oligomers of that bis(allyl carbonate), and tris(hydroxyethyl) isocyanurate tris(allyl carbonate) are proposed in U.S. Pat. No. 4,812,545.

U.S. Pat. No. 5,017,666 polymerizes the polyol(allyl carbonate) in organic solvent solution until 20-50% of the allylic carbon-carbon linkages are consumed in order to form a gel-free, syrupy viscous liquid of unpolymerized monomer and polymer to achieve lessened shrinkage in the ultimate product.

U.S. Pat. No. 4,957,981 to J.A.J. Schutyser et al. covers interpenetrating polymer networks of an aliphatic polyol (allyl carbonate) and an epoxy resin. The composition relies upon polymerizing the polyol(allyl carbonate) by radical initiation and the epoxy resin by acid catalysis with the two polymerizations being carried out wholly or partially simultaneously. This patent distinguishes its materials from copolymers of a polyol(allyl carbonate) and an epoxy-group containing olefin monomer, for example, glycidyl acrylate, of the type shown in U.S. Pat. No. 4,138,538.

SUMMARY OF THE INVENTION

The present invention relates to a polyol(allyl carbonate) based casting composition suitable for forming high quality ophthalmic lenses which contains an epoxy compound in an amount effective to reduce shrinkage during its final polymerization in a mold. The casting composition of the present invention comprising polyol(allyl carbonate) and epoxy compound contains an initiator for the polymerization of the polyol(allyl carbonate), but does not contain a catalyst for polymerization of the epoxy compound. The invention also relates to a method for reducing the shrinkage of casting compositions comprising polyol(allyl carbonate).

DESCRIPTION OF PREFERRED EMBODIMENTS

The polyol(allyl carbonate) monomers which form a predominant proportion (e.g., from about 90% to about 97%, by weight of the entire composition) can be represented by the graphic formula:

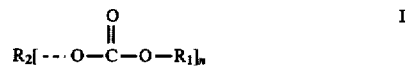

$$R_2[-O-C(=O)-O-R_1]_n \quad I$$

wherein $R_1$ is the radical derived from the unsaturated alcohol and is an allyl or substituted allyl group, $R_2$ is the radical derived from the polyol and n is a whole number from 2–5, preferably 2. The allyl group, $R_1$, can be substituted at the 2 position with a halogen, most notably chlorine or bromine, or an alkyl group containing from 1 to 4 carbon atoms, generally a methyl or ethyl group. The $R_1$ radical can be represented by the graphic formula:

$$H_2C=C(R_0)-CH_2- \quad II$$

wherein $R_0$ is hydrogen, halogen, or a $C_1$–$C_4$ alkyl group. Specific examples of $R_1$ include the groups: allyl, 2-chloroallyl, 2-bromoallyl, 2-fluoroallyl, 2-methallyl, 2-ethylallyl, 2-isopropylallyl, 2-n-propylallyl, and 2-n-butylallyl. Most commonly, $R_1$ is the allyl group, $H_2C=CH-CH_2-$. $R_2$ is a polyvalent radical derived from the polyol, which can be an aliphatic or aromatic polyol that contains 2, 3, 4 or 5 hydroxy groups. Typically, the polyol contains 2 hydroxy groups, i.e., a glycol or bisphenol. The aliphatic polyol can be linear or branched and contain from 2 to 10 carbon atoms. Commonly, the aliphatic polyol is an alkylene glycol having from 2 to 4 carbon atoms or a poly($C_2$–$C_4$) alkylene glycol, i.e., ethylene glycol, propylene glycol, trimethylene glycol, tetramethylene glycol, or diethylene glycol, triethylene glycol, etc.

The aromatic polyol can be of the type described at Col. 6, lines 3–44 of U.S. Pat. No. 5,017,666, which is incorporated herein by reference.

Specific examples of polyol(allyl carbonate) monomers useful in the practice of the invention herein contemplated include ethylene glycol bis(2-chloroallyl carbonate), ethylene glycol bis(allyl carbonate), diethylene glycol bis(2-methallyl carbonate), diethylene glycol bis(allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4- butanediol bis(2-bromoallyl carbonate), dipropylene glycol bis(allyl carbonate), trimethylene glycol bis(2-ethylallyl carbonate), pentamethylene glycol bis(allyl carbonate), and isopropylidene bisphenol bis(allyl carbonate). Industrially important polyol bis(allyl carbonate) species which are especially preferred include diethylene glycol bis(allyl carbonate), triethylene glycol bis(allyl carbonate), and ethylene glycol bis(allyl carbonate). Diethylene glycol bis(allyl carbonate) is commercially available from Akzo Nobel Chemicals, Chicago, Ill. under the trademark Nouryset®200.

The epoxy compound added to the casting composition comprising polyol(allyl carbonate) monomer is preferably added in amounts of from about 3% to about 10%, by weight and can be selected from a wide variety of such epoxy compounds known to persons of ordinary skill in the art. Generally speaking, commercially available epoxy compounds will be preferred for reasons of economy. Bisphenol A-based epoxy compounds can be used including those which are derived from bisphenol A and epichlorohydrin. Representative epoxy compounds of this type are commercially available from Shell Chemicals under the trademarks EPON 828 and EPON 1001 F. Other types of epoxy compounds which can be used are the cycloaliphatic-based epoxy compounds and include bis(3,4-epoxycyclohexyl adipate), available as ERL 4299 from Union Carbide, 3,4-epoxycyclohexylmethyl-3,4-epoxycyclohexane carboxylate, available as ERL 4221 from Union Carbide, and 2-(3,4-epoxycyclohexyl-5,5-spiro-3,4-epoxy (cyclohexane-meta-dioxane, available as ERL 4234 from Union Carbide.

The polymerization of the casting compositions comprising polyol(allyl carbonate) monomer can be initiated by conventional techniques such as initiation by free radicals formed by thermic decomposition of initiators such as the organic peroxide compounds. Examples of such compounds include but are not limited to: benzoyl peroxide, p-chlorobenzoyl peroxide, 2,4-dichlorobenzoyl peroxide, decanoyl peroxide, lauroyl peroxide, and acetyl peroxide. Other acceptable initiators include but are not limited to percarbonates such as diisopropyl peroxydicarbonate, di-sec. butyl peroxydicarbonate, and di-2-ethylhexyl peroxydicarbonate; alkyl peresters such as tbutyl-peroxy-2-ethyl hexanoate and t-butyl peroxypivalate, perketals such as 1,1 -di(t-butylperoxy)-3,3,5-trimethyl cyclohexane, and azo compounds such as azobisisobutyronitrile; and/or mixtures of such initiators. The amount of initiator is dependent on the type of polymerization, the polymerization conditions, the monomers used, etc: Generally, an amount of 0.05–10% by weight, preferably of 0.1–8% by weight of the total weight of polyol(allyl carbonate) will suffice. The polymerization reaction is preferably carried out in a mould. The quality of the optical products according to the invention is influenced to a large extent by the polymerization temperature, which is dependent on the types of monomers and on their relative weight ratios as well as on the type of initiator. In general, it is preferred that the polymerization reaction be initiated at a relatively low temperature, the temperature be increased gradually, and the product cured at elevated temperature toward the end of the polymerization reaction. Preferred conditions generally allow the polymerization to be completed in 24 hours or less. Optionally, the polymerization reaction may be carried out in the presence of mould releasing agents, UV-stabilizers, antioxidants, dyes, and a phlegmatizer for the initiator. Such techniques are illustrated by, for example, U.S. Pat. No. 5,017,666 which is incorporated herein by reference.

The polymeric materials according to the invention can be utilized for the manufacture of a wide range of optical products, such as corrective and piano lenses for spectacles, more particularly for protective goggles, lenses in optical instruments, guards, transparent covers for watches, measuring instruments, and the like. Because of their satisfactory dye receptivity the materials also are very suited to be used in the manufacture of tinted optical products, such as sun-glasses.

The present invention is further illustrated by the Examples which follow.

EXAMPLES 1–13

The diethylene glycol bis(allyl carbonate), or "DGBC", used in these Examples was NOURYSET®200 brand, supplied by Akzo Nobel Chemicals Inc. The initiator used in carrying out the polymerization was a mixture of isopropyl and sec-butyl peroxydicarbonates, namely, TRIGONOX®ADC brand, also supplied by Akzo Nobel Chemicals Inc.

Monomer blends were prepared by adding an epoxy resin to the DGBC and mixing the resulting blends for five minutes until homogeneity was achieved. The initiator was then added at 3.2 weight percent based on DGBC weight only. The resulting blend was vacuum stripped at 20–40 mm Hg for ten minutes to remove dissolved air, and was then filtered at fifteen psi nitrogen pressure through a stainless steel high pressure filter fitted with a nylon 10 μpore size filter paper. A dispensing gun attached to the filter facilitated mold filling with the monomer mixture. Lenses were prepared for the DGBC control and the epoxy/DGBC compositions where EPON 828 brand epoxy was used as the epoxy resin; all other compositions were prepared as sheets.

A lens mold consisted of two 75 mm diameter glass lens molds, a 14 mm thick gasket material and a clamp. The lens molds were fitted into the gasket and a clamp was placed over the molds to secure them to the gasket. Molds were placed in air ovens for polymerization.

A sheet mold consisted of two 7.5"×7.5"×0.25" borosilicate plate glass sheets, a 9 mm thick gasket cord, and twelve spring loaded binder clips. The gasket was placed between the two sheets, about ½" inward along all sides. Then the clips were placed around the mold to secure the two sheets together.

The polymerization was carried out in a programmable horizontal flow, air oven (VMR Scientific equipped with a Honeywell microprocessor) with the following cycle:

| TEMPERATURE (°C.) | ELAPSED HOURS |
| --- | --- |
| 45 | 0.0 |
| 45 | 8.5 |
| 50 | 12.0 |
| 60 | 16.0 |
| 80 | 21.0 |
| 60 | 22.0 |
| 60 | end of cycle |

Shrinkage of the polymerized material was calculated by use of the following equation:

$$\% \text{ Shrinkage} = \frac{D_p - D_m}{D_p} \times 100$$

where $D_p$ is the density of the polymerized material and $D_m$ is the density of the DGBC-containing or liquid resin. The density determinations were made at 25° C.

The density determination of the liquid resin ($D_m$) was determined as follows: In order to determine $D_m$ liquid resin sample was equilibrated in a 25° C. water bath for a minumum of fifteen minutes. A 4 dram glass vial with screw cap was weighed and then filled with 10 ml monomer sample delivered via a volumetric pipet. The glass vial was then reweighed. A second determination of monomer weight using a fresh glass vial was then made.

The density of the monomer was calculated using the following formula:

$$\text{Density} = \frac{\text{Mass, g}}{\text{Volume, mL}} \quad (\text{vol} = 10\,\text{mL})$$

The density of the polymerized material ($D_p$) was also determined. In preparation for the determination, three pieces were cut from the lens or sheet into approximately 1"×½"×½" pieces which were then polished with sandpaper. The test pieces weighed a minimum of 1.0 gram each. Three test pieces per sample were used.

The test pieces were conditioned prior to the determination by being placed in a stoppered Erlenmeyer flask which was thermostatted to 25° C. for fifteen minutes.

An analytical balance was placed on a stationary support which allowed for access to the balance pan. A wire basket was fabricated from a corrosion-resistant material and was suspended from the balance. It was used for suspending the sample in water. The immersion vessel was a 250 mL jacketed beaker which was thermostatted to 25° C. with water from a reservoir.

The test piece was weighed and the temperature of the water in the beaker was recorded. A wire basket was attached to a balance pan making sure that the basket was completely immersed in the water. The balance was zeroed while the basket was immersed in water. The test piece was gently dropped into the basket with tweezers and the weight was recorded immediately.

The following sets forth the polymer density calculation:

AW=sample weight in air WW=sample weight in water

Water density at 25° C.=0.99707 g/cc $$\frac{AW - WW}{\text{Water Density}} = \text{Volume}$$

Density = Mass/Volume

The density value is given as the average of the three runs. For each composition, one lens/sheet was prepared and the shrinkage was determined. A diethylene glycol bis(allyl carbonate) lens was also prepared as a control and showed a shrinkage of 13.16%. In Table 1, the compositions containing epoxy and the percent shrinkage are given:

TABLE 1

EPOXY USED WITH DGBC

| Wt % Epoxy | EPON 828 1 | EPON 1001F 2 | ERL 4221 3 | ERL 4299 4 | ERL 4234 5 |
|---|---|---|---|---|---|
| 3% | 12.15 | 12.58 | 13.10 | 12.99 | 13.22 |
| 5% | 11.78 | 12.18 | 12.82 | 12.73 | 12.92 |
| 10% | 10.39 | — | 12.24 | 12.36 | — |

EPON 828 epoxy is a bisphenol A/epichlorohydrin-derived epoxy available from Shell Chemicals.
EPON 1001F epoxy is an epichlorohydrin-derived epoxy available from Shell which is derived by reacting a bisphenol A/epichlorohydrin-derived epoxy with additional bisphenol A.

TABLE 1-continued

EPOXY USED WITH DGBC

| Wt % Epoxy | EPON 828 1 | EPON 1001F 2 | ERL 4221 3 | ERL 4299 4 | ERL 4234 5 |
|---|---|---|---|---|---|

ERL 4299 epoxy is bis(3,4-epoxycyclohexyl adipate) and is available from Union Carbide.
ERL 4221 epoxy is 3,4-epoxycyclohexylmethyl-3,4-epoxycyclohexane carboxylate and is available from Union Carbide.
ERL 4234 epoxy is 2-(3,4-epoxycyclohexyl-5,5-spiro-3,4-epoxy) cyclohexane-metadioxane and is available from Union Carbide.

From Table 1, it can be seen that Resin #1, EPON 828 brand epoxy in DGBC, was exceptional in reducing shrinkage, from about 8% to 21%. At 3% EPON 828 brand epoxy, the lens was clear and homogenous and had applications for ophthalmic lenses. The compositions containing 5% and 10% EPON 828 brand epoxy compromised the optical clarity of the lens.

Resin #2 reduced shrinkage at 3% and 5% epoxy concentration by 4% and 7%, respectively. At a 10% concentration, Resin #3 reduced shrinkage by 7%, and Resin #4 reduced it by 6%. Resin #5 showed about a 2% improvement in shrinkage at 5% epoxy concentration.

The foregoing Examples should not be construed in a limiting sense since they are intended to merely illustrate certain possible embodiments of the claimed invention. The scope of protection sought is set forth in the claims which follow.

We claim:

1. A casting composition having reduced shrinkage which comprises at least one polymerizable polyol(allyl carbonate) monomer, an initiator for the polymerization of said least one polymerizable polyol(allyl carbonate) monomer, and an epoxy compound in an amount effective to reduce the shrinkage of the casting composition during polymerization, wherein substantially no epoxy compound is polymerized into the final product.

2. The composition of claim 1 wherein the amount of epoxy compound ranges up to about 10% by weight of the composition.

3. The composition of claim 1 wherein the polymerizable polyol(allyl carbonate) monomer is diethylene glycol bis (allyl carbonate).

4. The composition of claim 2 wherein the composition comprises diethylene glycol bis(allyl carbonate).

5. The composition of claim 1 wherein the epoxy compound is a bisphenol A-based epoxy compound.

6. The composition of claim 2 wherein the epoxy compound is a bisphenol A-based epoxy compound.

7. The composition of claim 3 wherein the epoxy compound is a bisphenol A-based epoxy compound.

8. The composition of claim 4 wherein the epoxy compound is a bisphenol A-based epoxy compound.

9. The composition of claim 1 wherein the epoxy compound is a cycloaliphatic-based epoxy compound.

10. The composition of claim 2 wherein the epoxy compound is a cycloaliphatic-based epoxy compound.

11. The composition of claim 3 wherein the epoxy compound is a cycloaliphatic-based epoxy compound.

12. The composition claim 4 wherein the epoxy compound is a cycloaliphatic-based epoxy compound.

13. The composition of claim 1 wherein from about 90% to about 98% by weight of at least one polymerizable polyol(allyl carbonate) monomer is included in the composition.

* * * * *